(12) United States Patent
Yoshida et al.

(10) Patent No.: US 7,207,571 B2
(45) Date of Patent: *Apr. 24, 2007

(54) STEEL PISTON RING

(75) Inventors: Hideki Yoshida, Tokyo (JP); Akira Sato, Kashiwazaki (JP); Rolf Helle, Düsseldorf (DE)

(73) Assignee: Kabushiki Kaisha Riken, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/108,719

(22) Filed: Apr. 19, 2005

(65) Prior Publication Data

US 2005/0184466 A1    Aug. 25, 2005

Related U.S. Application Data

(62) Division of application No. 10/380,799, filed as application No. PCT/JP02/07741 on Jul. 30, 2002.

(30) Foreign Application Priority Data

Aug. 2, 2001 (JP) .............................. 2001-234894
May 14, 2002 (JP) .............................. 2002-139028

(51) Int. Cl.
*B60T 11/236* (2006.01)

(52) U.S. Cl. ...................... 277/434; 277/459; 277/460

(58) Field of Classification Search ............... 277/310, 277/434, 445, 459, 466, 460
See application file for complete search history.

(56) References Cited

U.S. PATENT DOCUMENTS

| 2,212,335 | A | | 8/1940 | Wenzel |
| 2,459,395 | A | | 1/1949 | Smith |
| 2,970,023 | A | | 1/1961 | Thompson |
| 3,926,166 | A | * | 12/1975 | Packard .................... 123/193.6 |
| 3,942,806 | A | | 3/1976 | Edlund |
| 5,655,433 | A | * | 8/1997 | Santi ........................... 92/208 |
| 6,206,379 | B1 | | 3/2001 | Toshiaki |
| 6,470,792 | B1 | | 10/2002 | Michel |
| 2002/0033579 | A1 | * | 3/2002 | Ishida ........................ 277/434 |

FOREIGN PATENT DOCUMENTS

| DE | 199 39 002 C1 | 8/2000 |
| JP | 56-27746 A | 3/1981 |
| JP | 64-35173 A | 2/1989 |
| JP | 7-42417 U | 8/1995 |
| JP | 10-252891 A | 9/1998 |
| JP | 2001-124204 A | 5/2001 |

* cited by examiner

*Primary Examiner*—William L. Miller
(74) *Attorney, Agent, or Firm*—Kubovcik & Kubovcik

(57) ABSTRACT

In a corner portion (2) defined between an outer peripheral surface (4) and a lower-side surface (3) of a steel piston ring (1), a groove (5, 6) having either an approximately quadrangular shape with a length of one side of 0.05 to 0.4 mm or an approximately quarter circular shape having a radius of 0.05 to 0.4 mm is formed. A sharp edge (9) formed by the groove (5, 6) performs an oil scraping function and the groove (5, 6) works to reduce an oil pressure of a second land or a third land clearance between the cylinder bore and the piston.

2 Claims, 8 Drawing Sheets

STEEL PISTON RING

This application is a division of U.S. patent application Ser. No. 10/380,799 filed Apr. 2, 2003, which is a 371 of international application PCT/JP02/07741, which claims priority based on Japanese patent application Nos. 2001-234894 and 2002-139028 filed Aug. 2, 2001, and May 14, 2002, respectively, which are incorporated herein by reference.

TECHNICAL FIELD

The present invention relates to piston ring, and more particularly to an improved piston ring made of a steel material.

BACKGROUND ART

A piston ring used in a reciprocating internal combustion engine is, based on a function thereof, classified into a pressure ring and an oil ring. In an automobile engine or the like, the pressure rings are generally composed of a first pressure ring which is positioned closest to a combustion chamber side and a second pressure ring which is positioned at a side below the first pressure ring (crank chamber side).

The first pressure ring is positioned close to the combustion chamber and hence, the first pressure ring is subjected to high temperature and not sufficiently lubricated. Accordingly, the first pressure ring is required to have high strength and good sliding characteristics. Conventionally, a piston ring made of cast iron which has a hard chromium plating layer formed on a sliding surface thereof has been popularly used. Recently, however, along with the increase of demand for higher speed, higher output and lower fuel consumption with respect to an internal combustion engine, requirements for piston ring are getting severer year by year. Under such circumstances, with respect to the first pressure ring, the conventional cast-iron piston ring having the chromium plating layer is not sufficient in view of the strength and the wear resistance. Accordingly, in place of the cast-iron piston ring, a steel piston ring made of martensitic stainless steel with a nitriding has been widely used.

On the other hand, the sliding circumstance of the second pressure ring is not so severe compared with the first pressure ring and hence, a cast-iron piston ring made of such as flaky graphite cast iron has been used up to now and a shift to steel material has not been taken place. However, from a viewpoint of the prevention of the increase of the global greenhouse effect, an automobile engine is required to satisfy the further reduction of the fuel consumption so that the reduction of weight of the piston ring is desired.

In view of such circumstances, there has been observed a trend that a base material of the second pressure ring is shifted from cast iron to steel in the same manner as the first pressure ring thus producing a steel piston ring which is thinner and lighter than the cast-iron piston ring.

Here, while the first pressure ring and the second pressure ring are required to have a function of sealing a combustion gas, these pressure rings are also required to have a function of scraping a lubricant applied to an inner peripheral surface of a cylinder by an oil ring toward a crankcase side as an important function thereof. Accordingly, these pressure rings are required to satisfy a condition that the pressure rings easily ride on the applied lubricant during a piston upward stroke (when the piston moves upwardly toward a cylinder head) and easily scrape the lubricant during the piston downward stroke (when the piston moves downwards).

To satisfy such a requisite, it is desired that an outer peripheral sliding surface of the piston ring is formed into a barrel-face surface or has a diameter thereof decreased and inclined toward a combustion chamber side thus forming a so-called taper-face surface, and a lower-surface-side corner portion which is defined by a lower side surface and an outer peripheral sliding surface forms a so-called sharp edge having an acute angle. Since the conventional cast-iron material exhibits the good machinability, it is easy to machine the piston ring in such a shape.

However, the machinability of the steel material is inferior to that of the cast iron material. Accordingly, it has been found that, in producing the above-mentioned piston ring having a sharp edge, when the base material of the first pressure ring and the second pressure ring is shifted from the cast iron to the steel, more burrs are frequently generated in grinding and lathe_turning of the piston ring and hence, the productivity is remarkably decreased.

In general, a steel wire material which constitutes a raw material of a steel piston ring having a rectangular cross section is manufactured by drawing and/or rolling a steel material as described in a publication entitled "Manufacturing method of piston ring material" and accorded "Japanese Patent Laid-open Publication No. 035173/1989". The wire material is coiled and cut in a ring shape. Grinding, lathe turning and the like are done thereafter so as to manufacture piston rings having a given size.

Accordingly, as shown in FIG. 1 and FIG. 3, at a stage that only the coiling is done, each corner portion 2 of the piston ring 1 maintains a round corner with a radius of R which the wire material originally has. Accordingly, to manufacture the piston ring having a sharp edge, it is necessary to machined out the whole side surface or the whole outer peripheral surface of the piston ring piece by an amount of R by grinding or lathe turning.

However, as mentioned previously, since the steel material is tough, it is difficult to remove swarf or turnings from the piston ring thus increasing the generation of so-called "burrs". Accordingly, compared with the use of the cast-iron material, to suppress the generation of the burrs, it is necessary to provide means such as reducing a grinding speed, making a depth of cut small and the like thus remarkably decreasing the machining productivity.

On the other hand, to enhance an oil scraping function of a piston ring, as disclosed in Japanese Patent Laid-open Publication No. 124204/2001, a piston ring, of which a groove is formed at a corner portion defined between an outer peripheral sliding surface and a lower side surface, but interrupted at abutting end portions, has been known. This groove is extending axially up to a barrel-face crest portion. However, a depth of the groove in the radial direction is equal to or more than 0.5 mm and hence, this constitutes one of usual piston rings having an interrupted undercut shape.

Although the publication does not specifically describe material of the piston ring, in view of a machining operation to manufacture the piston ring of the interrupted undercut shape, the piston ring may be made of cast iron. This can be supported by a fact that there is no specific suggestion with respect to a steel piston ring in the publication. When this known technique is applied to a steel piston ring, as mentioned previously, problems still remain with respect to the suppression of the generation of burrs and the machining productivity.

Further, to mention performances of the piston ring, it is necessary to provide additional shapes to the piston ring and hence, following problems arise.

(1) Since the undercut is large, it is necessary to interrupt the undercut at abutting end portions to cope with the oil consumption and a blowby gas from the abutting end portions.

(2) Since the piston ring is twisted in the use state when the undercut is large, it is necessary to form an inner cut in an inner peripheral side to establish a balance.

The present invention has been made in view of such drawbacks and it is an object of the present invention to provide a steel piston ring which exhibits superior oil scraping performance and good productivity.

DISCLOSURE OF THE INVENTION

To solve the above-mentioned problems, the present invention provides a steel piston ring which is characterized in that a groove having either an approximately quadrangular cross section with a length of each side of 0.05 to 0.4 mm or an approximately quarter-circular cross section with a radius of 0.05 to 0.4 mm is formed at a corner portion defined by an outer peripheral surface and a lower-side surface of a piston ring body and the groove is continuously extended to abutting end faces.

It is preferable that the outer peripheral sliding surface has a barrel shape or a taper shape.

Further, in a combination of piston rings having a plurality of pressure rings, the present invention preferably adopts a combination of piston rings in which at least two piston rings satisfy the above-mentioned constituent features.

The present invention provides a combination of steel-made piston rings which is characterized in that a first (top) ring includes a groove having an approximately quadrangular cross section with a length of each side of 0.05 to 0.4 mm at a corner portion defined between a barrel-face or taper-face outer peripheral surface and a lower side surface of a piston ring body, and a second ring includes a groove having an approximately quadrangular cross section with a length of each side of 0.05 to 0.4 mm at a corner portion defined between a taper-face outer peripheral surface and a lower side surface of a piston ring body, wherein the groove is continuously extended to abutting end faces.

Further, the present invention provides a combination of steel-made piston rings which is characterized in that a first (top) ring includes a groove having an approximately quarter-circular cross section with a radius of 0. 05 to 0.4 mm at a corner portion defined between a barrel-face or taper-face outer peripheral surface and a lower side surface of a piston ring body, and a second ring includes a groove having an approximately quarter-circular cross section with a radius of 0.05 to 0.4 mm at a corner portion defined between a taper-face outer peripheral surface and a lower side surface of a piston ring body, wherein the groove is continuously extended to abutting end faces.

It is needless to say that, from a technical aspect, it is possible to provide versatile combinations of piston rings including pressure rings having an straight face which satisfy the constitutional features of the present invention in at least two or all pressure rings among a plurality of pressure rings.

BEST MODE FOR CARRYING OUT THE INVENTION

Figure 1:
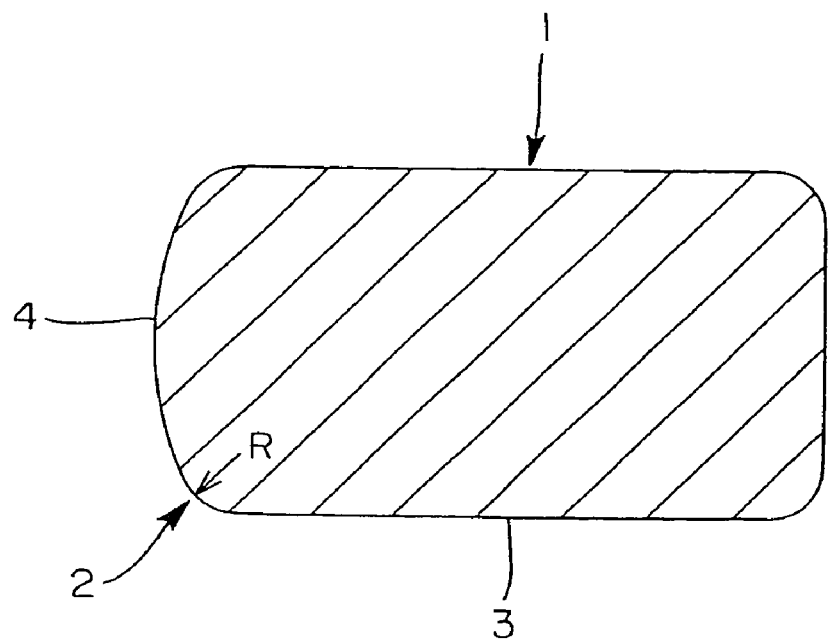
FIG. 1 is a partial cross-sectional view showing a basic shape of a barrel-face piston ring.
Figure 2:
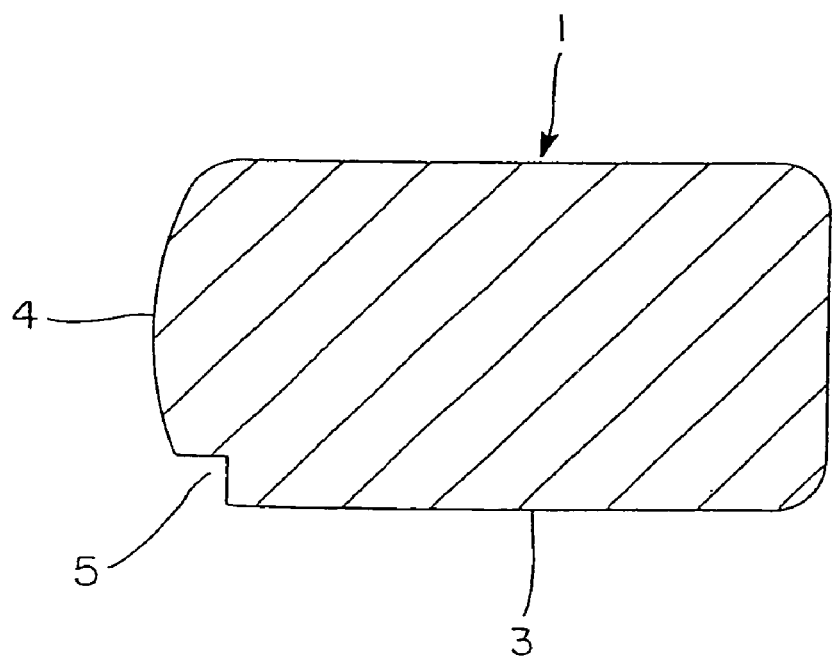
FIG. 2 is a partial cross-sectional view of the example shown in FIG. 1 in which a groove is formed at a corner portion.
Figure 3:
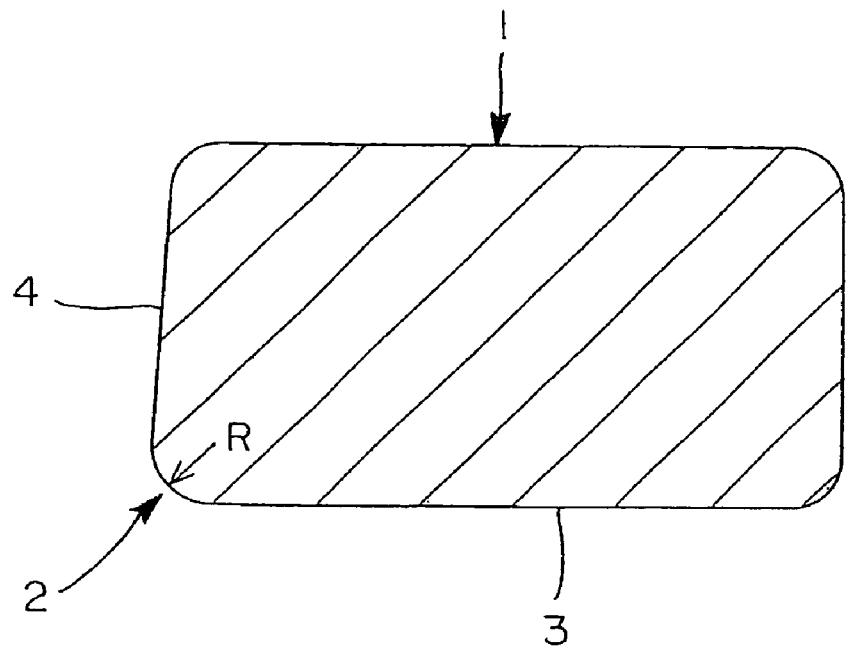
FIG. 3 is a partial cross-sectional view showing a basic shape of a taper-face piston ring.
Figure 4:
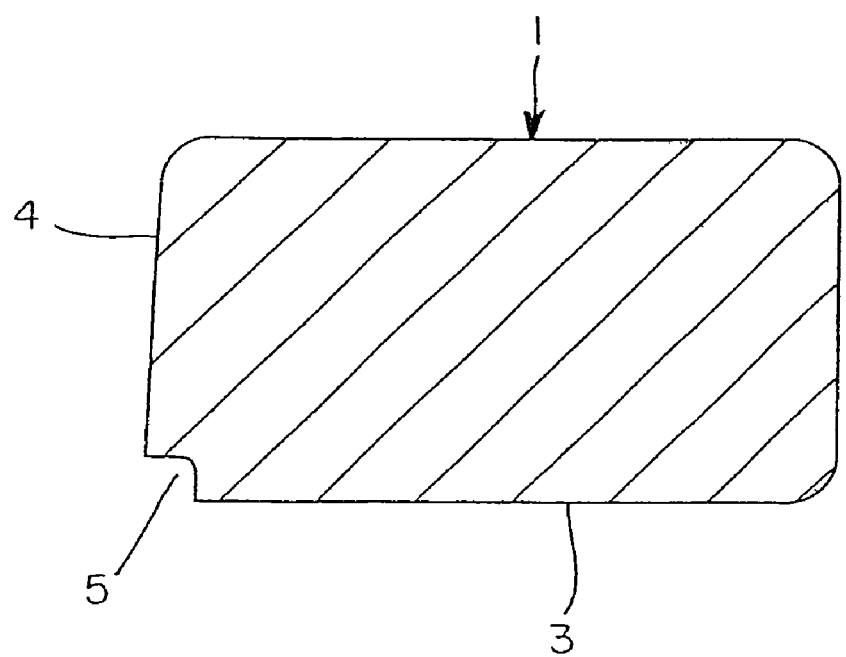
FIG. 4 is a partial cross-sectional view of the example shown in FIG. 3 in which a groove is formed at a corner portion.

The present invention adopts a following technique to suppress a machining amount of a lower side surface 3 and an outer peripheral surface 4 of a piston ring 1 having a barrel-face or a taper-face outer peripheral sliding surface, that is, to suppress a machining amount for obtaining a corner portion 2 having a sharp edge to a small amount. That is, in the present invention, a groove 5 (see FIG. 2, FIG. 4, FIG. 5 and FIG. 7) having an approximately quadrangular cross section with a length of each side of 0.05 to 0.4 mm or a groove 6 (see FIG. 6, FIG. 8) having an approximately quarter-circular cross section with a radius of 0.05 to 0.4 mm is formed in the corner portion 2 defined by an outer peripheral sliding surface 4 and the lower-side surface 3 of the piston ring 1 by use of lathe turning or grinding process at least by removing only a portion corresponding to an round portion remaining at the corner portion 2. Here, the groove 5 is continuously extended to abutting end faces without interruption.

Due to such a constitution, following advantageous effects can be obtained.

(1) At a lower end portion of the outer peripheral sliding surface, a new corner portion which is constituted of the machined portion and the outer peripheral surface forms a sharp edge 9 (see FIG. 5 to FIG. 8) so that the reliable lubricant scraping performance is obtained.

(2) Since the machining amount of the side surface and the outer peripheral surface 4 of the piston ring can be reduced, the generation of burrs can be suppressed.

In addition to the above, it is also possible to obtain an advantageous effect that the piston ring is not twisted even when such a groove is formed. Still further, it is possible to obtain an advantageous effect that with respect to the groove of such a size, it is unnecessary to provide any means or measures to cope with the oil consumption and a blowby gas in the vicinity of abutting end faces.

The reason why the length of one side of the groove 5 to be machined having an approximately quadrangular cross section is set to equal to or more than 0.05 mm and equal to or less than 0.4 mm is that a wire material for piston ring can be drawn and/or rolled only when a round_corner chamfering size of the wire material for piston ring falls in a range of 0.05 mm to 0.4 mm. When the length of one side is less than 0.05 mm, the round corner of the wire material cannot be sufficiently machined and hence, the sharp edge 9 cannot be formed whereby it is difficult to obtain the sufficient lubricant scraping performance.

Further, an R size, radius of the corner portion 2 which remains after machining both side surfaces and the outer peripheral surface, even at a maximum value, does not exceed an corner radius R of the original wire material and hence, the length of one side may be set to equal to or less than 0.4 mm. When the length of one side becomes greater than 0.4 mm, the generation of the burrs is occurred and hence, the productivity is decreased to the contrary.

Here, the groove portion, that is, the machined-away portion according to the present invention substantially increases a volume of a 2nd (second) land or a 3rd (third) land clearance between the cylinder bore and the piston although an increased amount is small. Accordingly, the oil pressure of the 2nd land or 3rd land clearance is reduced so that the elevation of the lubricant to a top land or the second land can be suppressed. That is, the groove portion plays a role of reducing the oil consumption.

In this context, the piston ring according to the present invention exhibits superior oil scraping effect (oil consumption reduction effect) to a sharp edged product made of simple cast iron.

Further, it is preferable that a barrel-face surface or a taper-face surface is formed on the outer peripheral surface of the piston ring. In this case, the groove is continuously formed without interruption until the groove is opened at the abutting end faces.

Here, a linear portion 4' formed on the outer peripheral surface is provided in a process of the outer periphery surface lapping. This is recognized in careful observation.

The present invention is explained hereinafter based on embodiments.

[Embodiments]

As a first pressure ring of a gasoline engine, a steel barrel-face ring (see FIG. 5 and FIG. 6) and a taper-face ring (see FIG. 7 and FIG. 8) having a nominal outer diameter of φ75×a width of 1.2 mm×a thickness of 2.3 mm are produced.

As a second pressure ring of the gasoline engine, a steel taper-face ring (see FIG. 7 and FIG. 8) having a nominal outer diameter of φ75×a width of 1.5 mm×a thickness of 2.6 mm is produced.

As a first pressure ring of a diesel engine, a steel barrel-face ring (see FIG. 5 and FIG. 6) having a nominal outer diameter of φ99.2×a width of 2.5 mm×a thickness of 3.9 mm is produced.

As a second pressure ring of the diesel engine, a steel taper-face ring (see FIG. 7 and FIG. 8) having a nominal outer diameter of φ99.2×a width of 2.0 mm×a thickness of 4.1 mm is produced.

Figure 9:
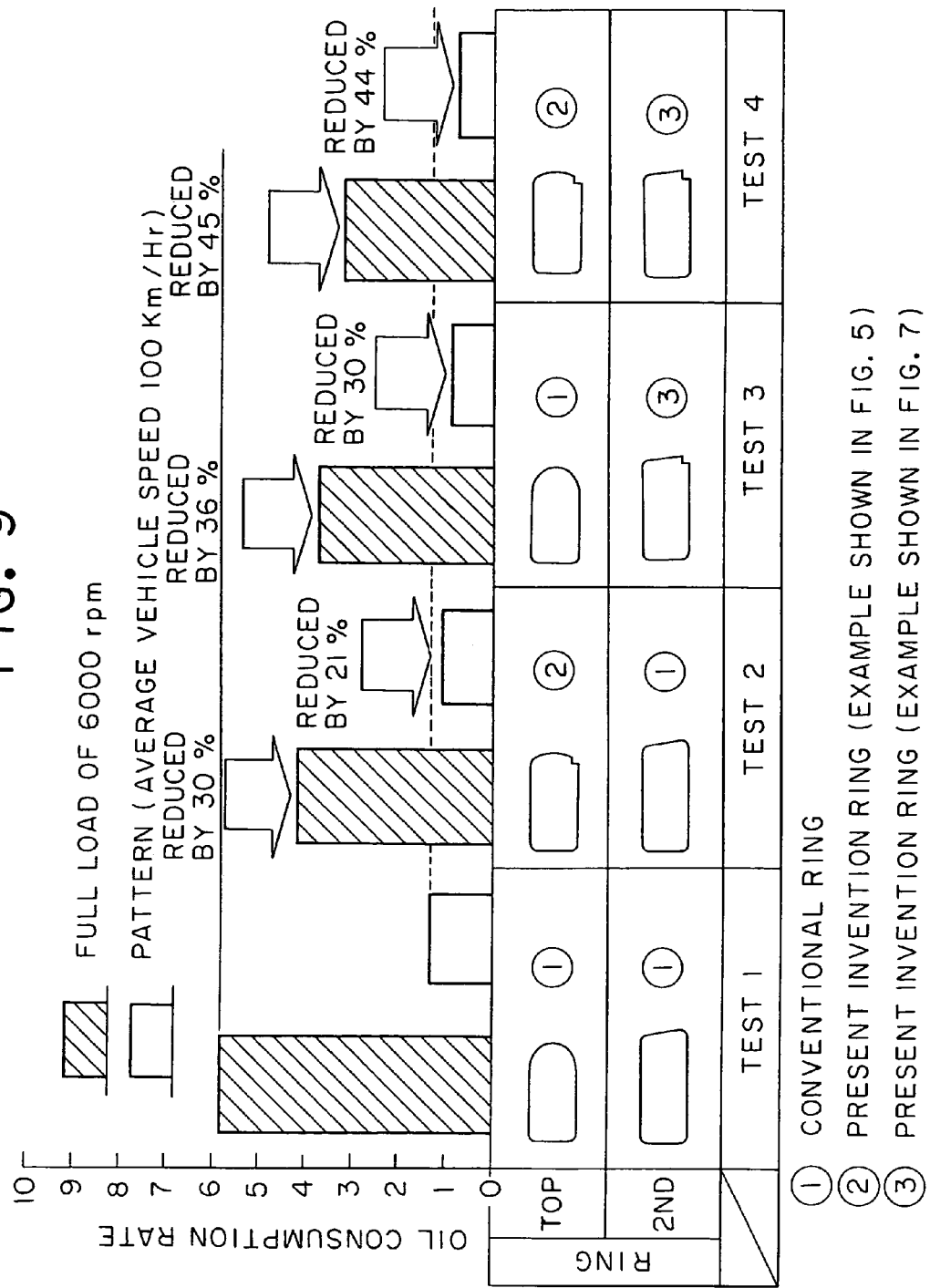
FIG. 9 shows an oil consumption amount (tests 1 to 4) under a full load condition of 6000 rpm and a given mode condition (PATTERN: vehicle average speed of 100 km/hr) in a gasoline engine.
Figure 10:
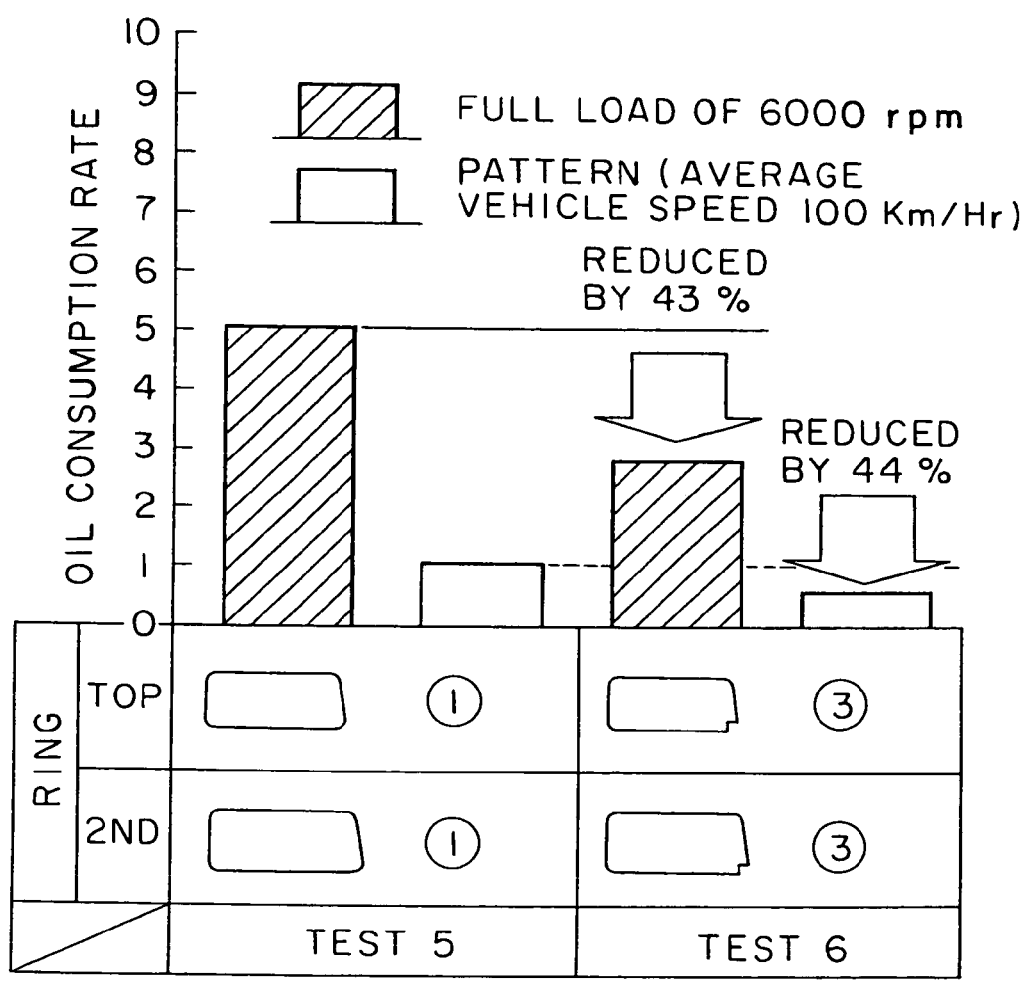
FIG. 10 shows an oil consumption (tests 5 and 6) using first and second pressure rings having a taper shape under the same condition as those shown in FIG. 9.
Figure 11:
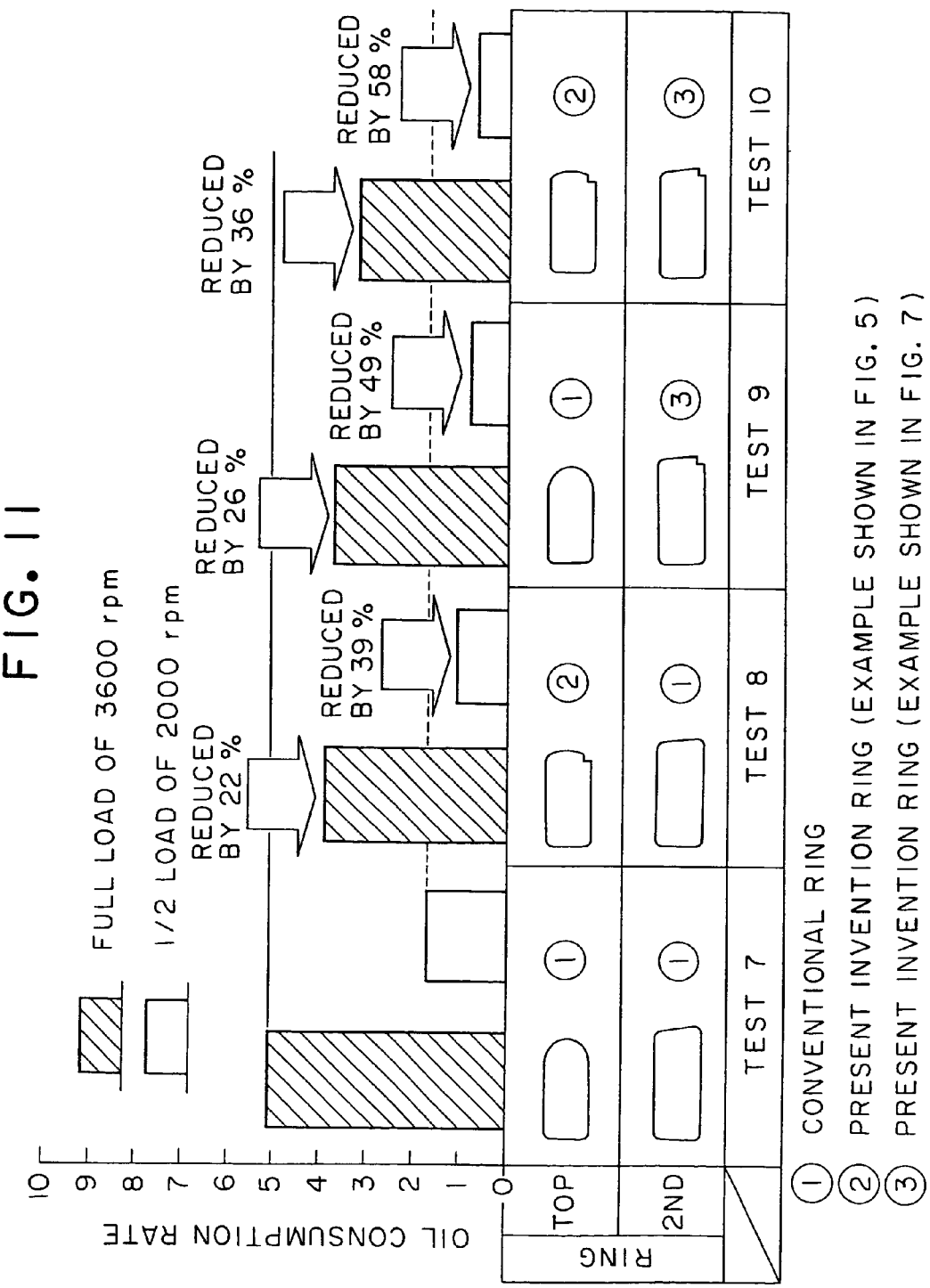
FIG. 11 shows an oil consumption amount (tests 7 to 10) under conditions of a full load of 3600 rpm and a ½ load of 2000 rpm.
Figure 12:
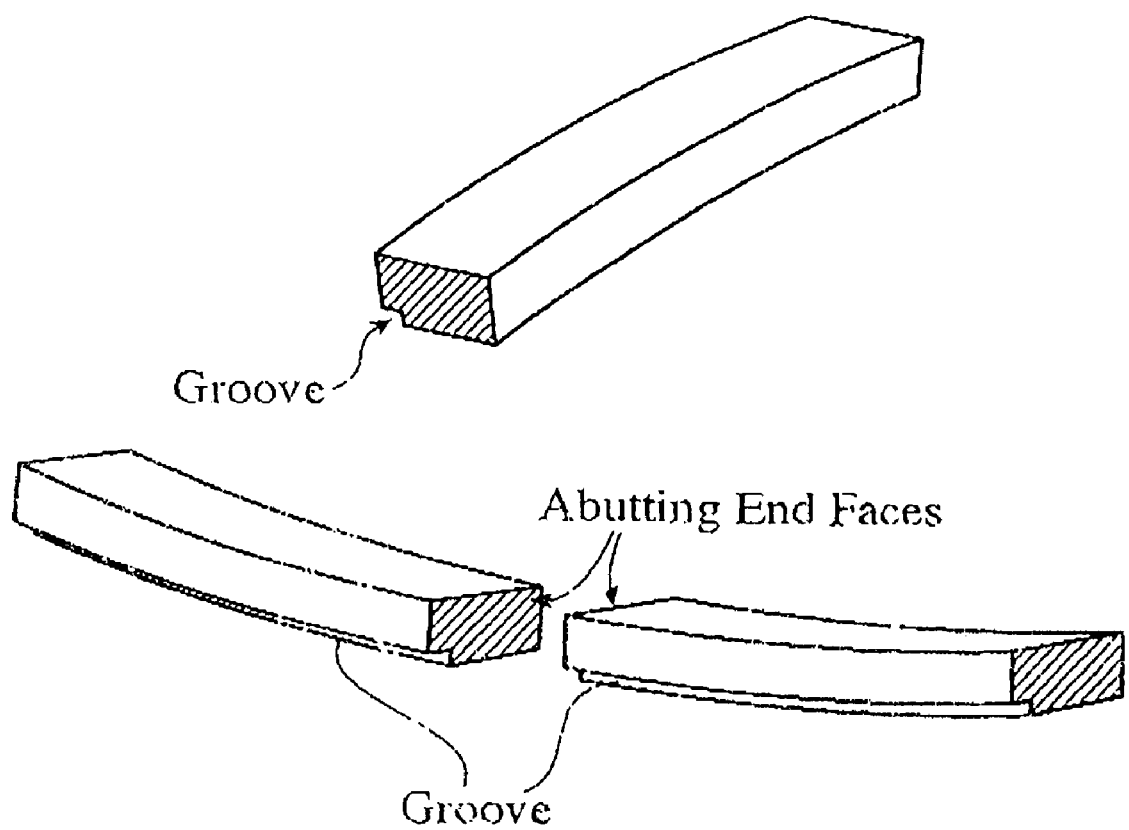
FIG. 12 is a view of the abutting end faces of a piston ring.

These steel piston rings are served for engine tests to confirm the advantageous effects of the present invention (see FIG. 9 to FIG. 11).

A wire material used for production of piston rings is a steel containing 0.59 to 0.66% by weight of C, 0.15 to 0.35% by weight of Si, 0.3 to 0.6% by weight of Mn, and equal to or less than 0.03% by weight of P and 0.03% by weight of S. For the first pressure ring of the gasoline engine, a rectangular wire material having a width of approximately 1.25 mm×a thickness of approximately 2.4 mm is used. For the second pressure ring of the gasoline engine, a rectangular wire material having a width of approximately 1.55 mm×a thickness of approximately 2.7 mm is used. For the first pressure ring of the diesel engine, a rectangular wire material having a width of approximately 2.55 mm×a thickness of approximately 4.0 mm is used. For the second pressure ring of the diesel engine, a rectangular wire material having a width of approximately 2.05 mm×a thickness of approximately 4.2 mm is used. All wire materials have a corner R of approximately 0.30 mm.

Conventional products and the present invention products are produced through following steps.

(Conventional Products)

barrel-face ring: coiling→heat treatment→side surface grinding→barrel face grinding→abutting-end-face gap machining→outer periphery surface lapping taper-face ring: coiling→heat treatment→side surface grinding→taper face grinding→abutting-end-face gap machining→outer periphery surface lapping (Present Invention Product)

barrel-face ring: coiling→heat treatment→side surface grinding→barrel face grinding→lower-surface-corner-portion machining→abutting-end-face gap machining→outer periphery surface lapping taper-face ring: coiling→heat treatment→side surface grinding→taper face grinding→lower-surface-corner-portion machining→abutting-end-face gap machining→outer periphery surface lapping After completion of side surface grinding, the corner portion has R of approximately 0.26 to 0.28 mm.

With respect to the conventional product, although the outer periphery surface lapping is performed after the barrel face grinding or the taper face grinding, the corner portion of the lower side surface is hardly machined and hence, the corner portion has R of approximately 0.26 to 0.28 mm.

Figure 5:
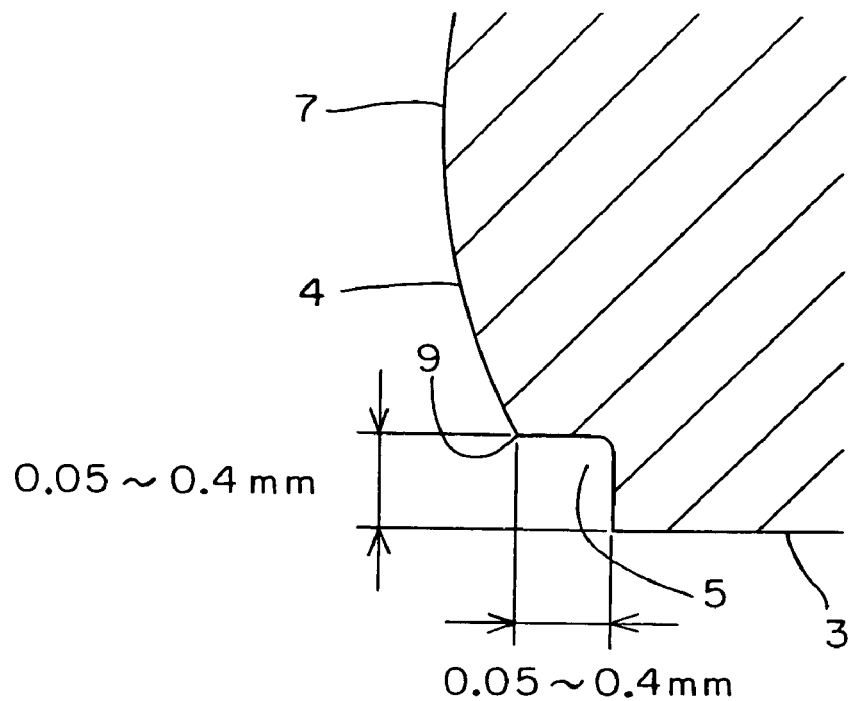
FIG. 5 is a partial enlarged cross-sectional view showing a detailed structure of the groove shown in FIG. 2.
Figure 6:
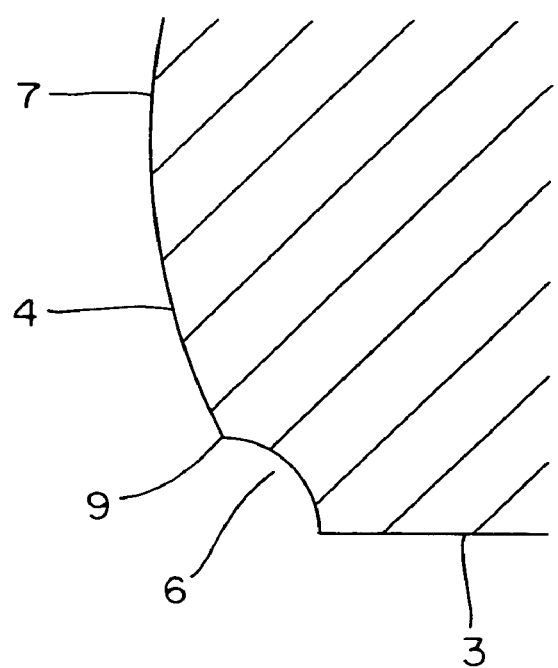
FIG. 6 is a partial enlarged cross-sectional view showing another example of the detailed structure of the groove shown in FIG. 2.
Figure 7:
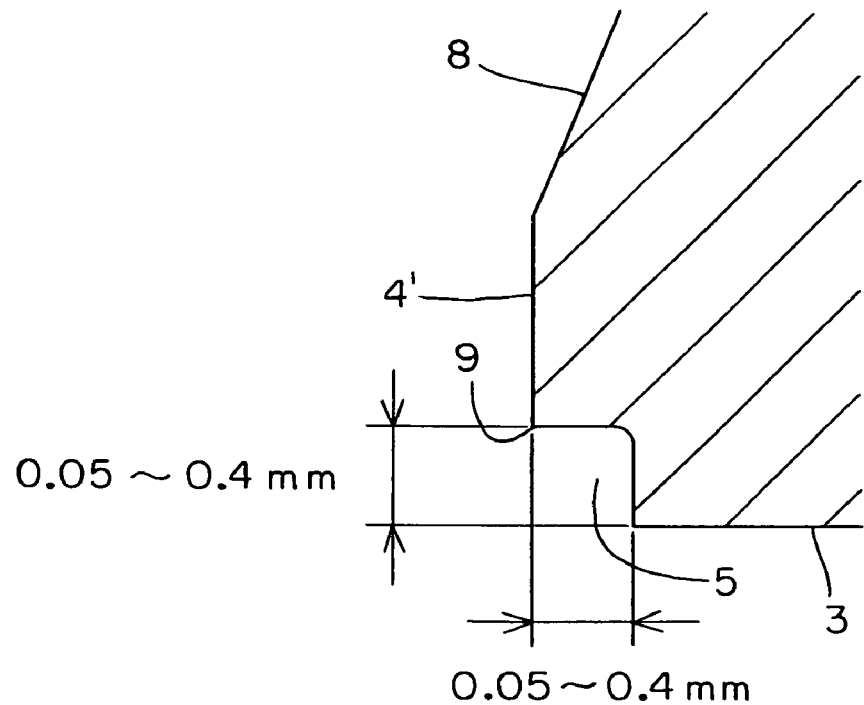
FIG. 7 is a partial enlarged cross-sectional view showing a detailed structure of the groove shown in FIG. 4.
Figure 8:
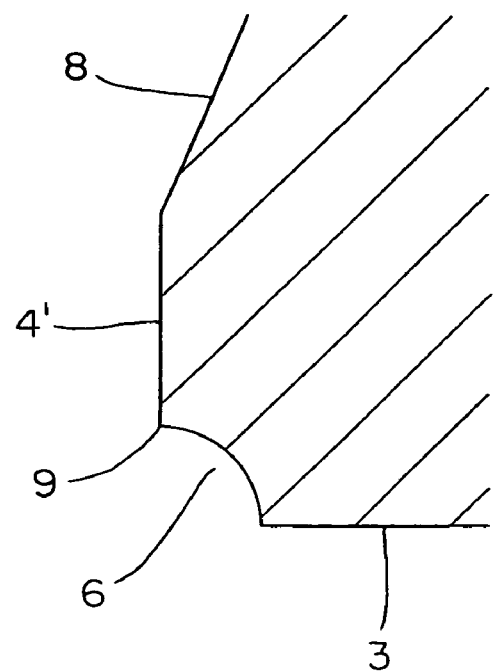
FIG. 8 is a partial enlarged cross-sectional view showing another example of the detailed structure of the groove shown in FIG. 4.

With respect to the present invention product, the lower surface corner portion 2 is machined using a coated carbide cutting tool such that a groove having an approximately quadrangular cross section with a length of each side of approximately 0.3 mm is formed in the piston ring (see FIG. 5 and FIG. 7). Further, besides such a piston ring, by changing cutting tool, a piston ring having a groove wherein a cross section of a machined portion is a quarter circular cross section having a radius of approximately 0.3 mm is produced (see FIG. 6 and FIG. 8).

The above-mentioned piston rings are used as the first (top) ring and the second ring of a 2 L gasoline engine and a 3.3 L diesel engine. Oil rings for normal use are used in these tests. Under such conditions, advantageous effects of the present invention with respect to the oil consumption are confirmed (comparing with the effects of tests 1, 5, 7 which are directed to conventional ring combinations.) Here, the conventional piston rings are made of the same material and having the same size as the present invention rings. (However, the conventional rings are not provided with grooves 5, 6.)

A combination in which the barrel-face ring and taper-face ring are used as the first pressure ring and the second pressure ring respectively in the gasoline engine is subjected to an oil consumption test under the full load of 6000 rpm or a given mode condition (PATTERN). A result of the test is shown in FIG. 9. A combination of the conventional rings is shown as a test 1.

It is confirmed that using the combination of the barrel-face present invention product as the first pressure ring and the taper-face conventional product as the second pressure ring, the oil consumption reduction ratio (to that of test 1) of 30% is obtained under the full load of 6000 rpm, while the oil consumption reduction ratio (to that of test 1) of 21% is obtained under the given mode condition (test 2).

Subsequently, it is confirmed that using the combination of the barrel-face conventional product as the first pressure ring and the taper-face present invention product as the second pressure ring, the oil consumption reduction ratio (to that of test 1) of 36% is obtained under the full load condition of 6000 rpm, while the oil consumption reduction ratio (to that of test 1) of 30% is obtained under the given mode condition (test 3).

Further, it is confirmed that using the combination of the barrel-face present invention product as the first pressure ring and the taper-face present invention product as the second pressure ring, the oil consumption reduction ratio (to that of test 1) of 45% is obtained under the full load condition of 6000 rpm, while the oil consumption reduction ratio (to that of test 1) of 44% is obtained under the given mode condition (test 4).

A combination in which the taper-face rings are respectively used as the first and the second pressure rings of the same gasoline engine is subjected to an oil consumption test under the full load condition of 6000 rpm or a given mode condition (PATTERN). A result of the test is shown in FIG. 10. A combination of the conventional rings is shown as a test 5.

It is confirmed that using the combination of the taper-face present invention products as the first and the second pressure rings, the oil consumption reduction ratio (to that of test 5) of 43% is obtained under the full load condition of 6000 rpm, while the oil consumption reduction ratio (to that of test 5) of 44% is obtained under the given mode condition (test 6).

A combination in which the barrel-face ring is used as the first pressure ring of the diesel engine and the taper-face ring is used as the second pressure ring of the diesel engine is subjected to an oil consumption test under the full load condition of 3600 rpm or a ½ load condition of 2000 rpm. A result of the test is shown in FIG. 11. A combination of the conventional rings is shown as a test 7.

It is confirmed that using the combination of the barrel-face present invention product as the first pressure ring and the taper-face conventional product as the second pressure ring, the oil consumption reduction ratio (to that of test 7) of 22% is obtained under the full load condition of 3600 rpm, while the oil consumption reduction ratio (to that of test 7) of 39% is obtained under the ½ load condition of 2000 rpm (test 8).

Subsequently, it is confirmed that using the combination of the barrel-face conventional product as the first pressure ring and the taper-face present invention product as the second pressure ring, the oil consumption reduction ratio (to that of test 7) of 26% is obtained under the full load condition of 3600 rpm, while the oil consumption reduction ratio (to that of test 7) of approximately 49% is obtained under the ½ load condition of 2000 rpm (test 9).

Further, it is confirmed that using the combination of the barrel-face present invention product as the first pressure ring and the taper-face conventional product as the second pressure ring, the oil consumption reduction ratio (to that of test 7) of 36% is obtained under the full load condition of 3600 rpm, while the oil consumption reduction ratio (to that of test 7) of 58% is obtained under the ½ load condition of 2000 rpm (test 10).

As can be clearly understood from the fore going tests, the combination of the first pressure ring and the second pressure ring, for example, the combination of the piston ring forming the groove having a quadrangular cross section in the barrel-face and the piston ring forming the groove having a quadrangular cross section in the taper-face shape is effective to reduce the oil consumption. Further, it is also confirmed from the test results carried out in the same manner that other combinations of piston rings shown in FIG. 9 to FIG. 11 can obtain the high oil consumption reduction ratio.

The invention claimed is:

1. A steel piston ring with an outer peripheral sliding surface of a taper shape for an internal combustion engine, characterized in that a groove having an approximately quadrangular cross section with a length of each side of 0.05 to 0.4 mm is formed at a corner portion defined by the outer peripheral surface and a lower-side surface of the piston ring and the groove is continuously extended to abutting end faces.

2. A steel piston ring according to claim 1, wherein a ring width is more than 1.5 mm.

* * * * *